INVENTOR
Robert L. Sproull
BY William A. Zalesak
ATTORNEY

March 21, 1950 R. L. SPROULL 2,501,545

FREQUENCY MODULATION SYSTEM

Filed March 26, 1946 4 Sheets-Sheet 2

INVENTOR
Robert L. Sproull
BY
William A. Zalesak
ATTORNEY

March 21, 1950 R. L. SPROULL 2,501,545

FREQUENCY MODULATION SYSTEM

Filed March 26, 1946 4 Sheets-Sheet 3

INVENTOR
Robert L. Sproull
BY
William A. Zalesak
ATTORNEY

INVENTOR
Robert L. Sproull
BY
William A. Zalesak
ATTORNEY

Patented Mar. 21, 1950

2,501,545

UNITED STATES PATENT OFFICE 2,501,545

FREQUENCY MODULATION SYSTEM

Robert L. Sproull, Penns Neck, N. J., assignor to Radio Corporation of America, a corporation of Delaware Application March 26, 1946, Serial No. 657,176

14 Claims. (Cl. 332—5)

Figure 1:
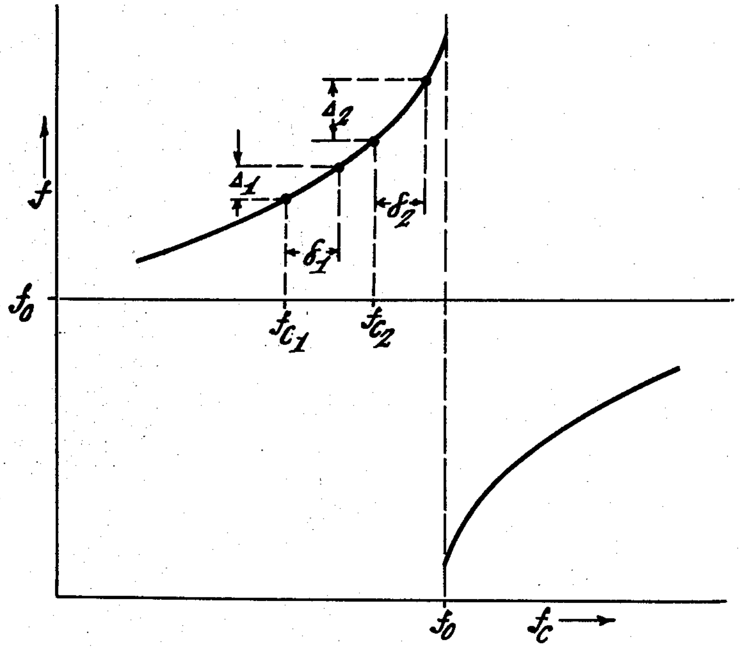

My invention relates to a frequency modulation system, particularly such a system useful for modulating the frequency of an ultra high frequency oscillator, for example, of the magnetron type utilizing cavity resonators although not limited thereto.

In order to modulate the frequency of ultra high frequency oscillators, it is desirable and frequently necessary to have a "reactance tube," which may be coupled to the oscillator. Changes in voltage or currents in the "reactance tube" then produce changes in the frequency of the oscillations generated by the oscillator.

A frequency modulating system which includes a magnetron oscillator coupled closely to a tuned circuit containing a "reactance tube" is described and claimed in my copending application, Serial No. 659,705 filed April 5, 1946, and assigned to the same assignee as the present application. A somewhat similar arrangement includes a coupled device in which an electron beam changes the resonant frequency of a coupled cavity resonator. A device of the second kind is described and claimed in the copending application of Lloyd P. Smith, Serial No. 563,732 filed November 16, 1944, and assigned to the same assignee as the present application.

The above types of modulating systems, while effective are subject to certain disadvantages. These include large power absorption in the coupled circuit; a change in the power absorption as the frequency of the coupled circuit is varied, thus causing unwanted amplitude modulation as well as the wanted frequency modulation; a change in the Q of the coupled circuit producing a change in the frequency of the circuit as well as a change in the ratio of the change in oscillator frequency to the change in the coupled circuit frequency resulting in an undesirable nonlinear characteristic. In connection with the second type of frequency modulating system employing a beam for changing the reactance of a coupled resonator circuit, under some conditions high currents and fields in the coupled circuit constitute a serious limitation.

It is, therefore, an object of my invention to provide an improved frequency modulating system for varying the frequency of ultra high frequency oscillators.

Another object of my invention is to provide a frequency modulating system particularly suitable for magnetrons employing cavity resonators.

Another object of my invention is to provide a frequency modulating system employing a coupled modulating circuit in which the power absorption in the coupled circuit is minimized.

Another object of my invention is to provide such a system in which a change in power absorption with a change in frequency of the coupled circuit is minimized, thus reducing amplitude modulation.

Another object of my invention is to provide a system of the kind described having linear characteristics.

A still further object of my invention is to provide a frequency modulating system employing a beam modulated resonator but in which high currents and fields are avoided or substantially eliminated in the coupled circuit.

These and other objects will appear hereinafter.

Figure 2:
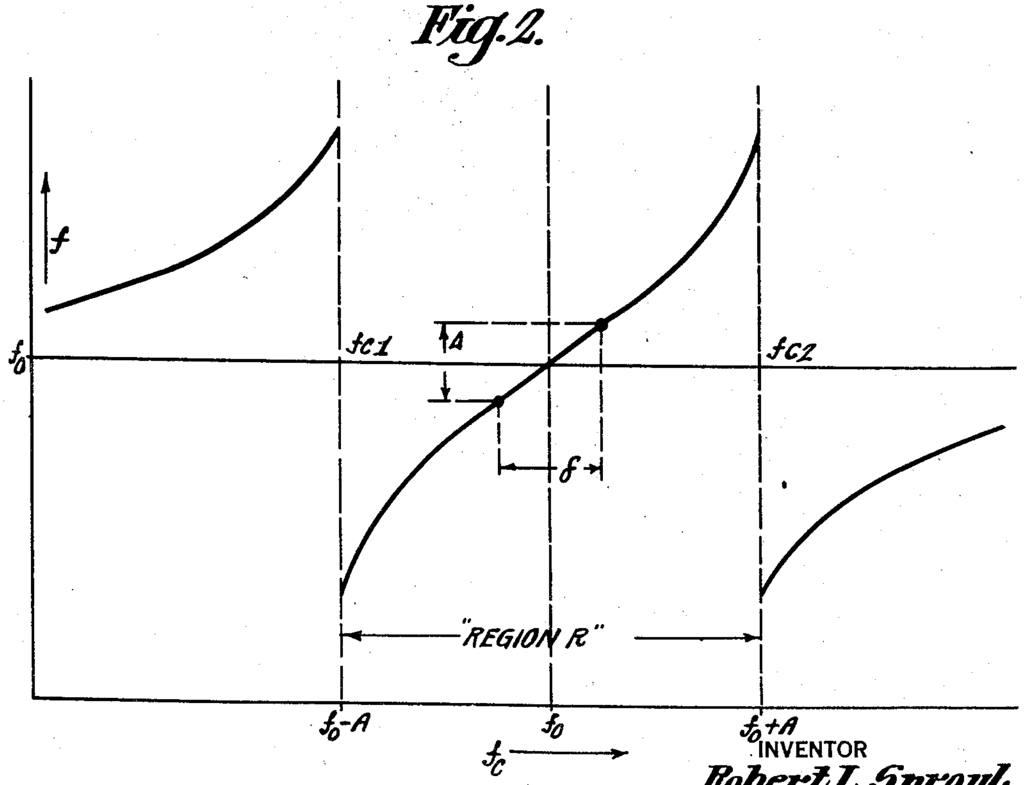
Figure 3:
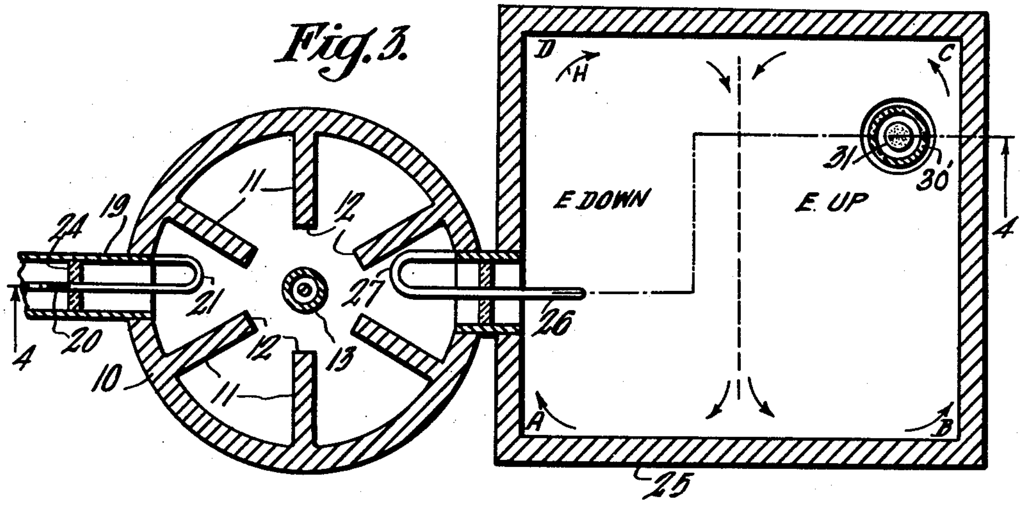
Figure 4:
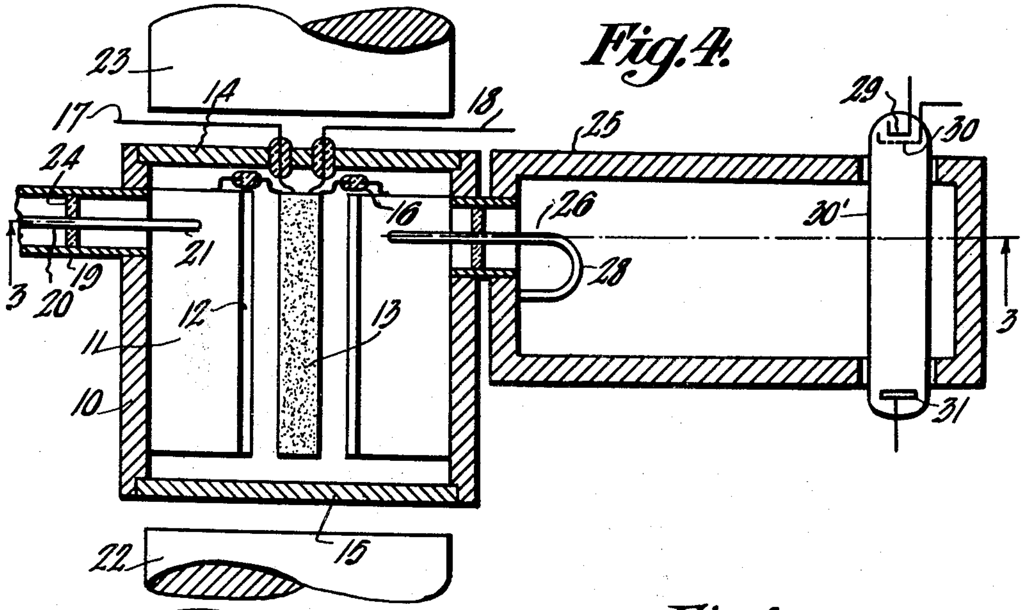
Figure 8:
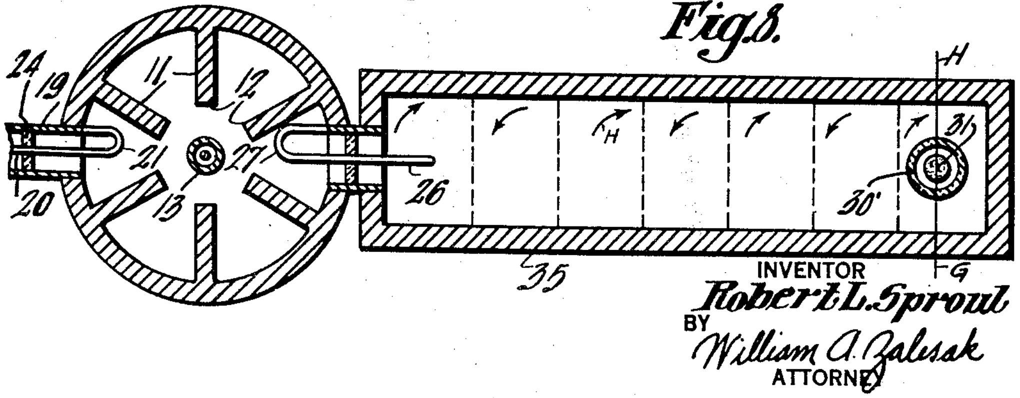
Figure 5:
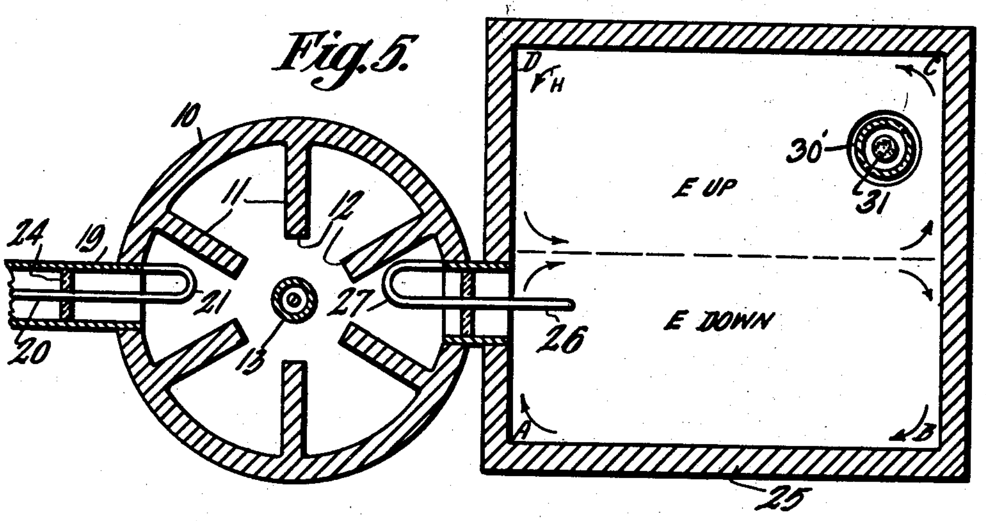
Figure 7:
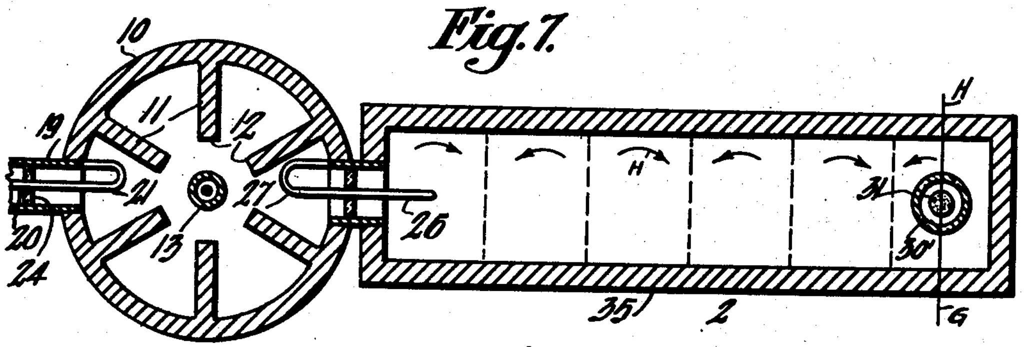
Figure 6:
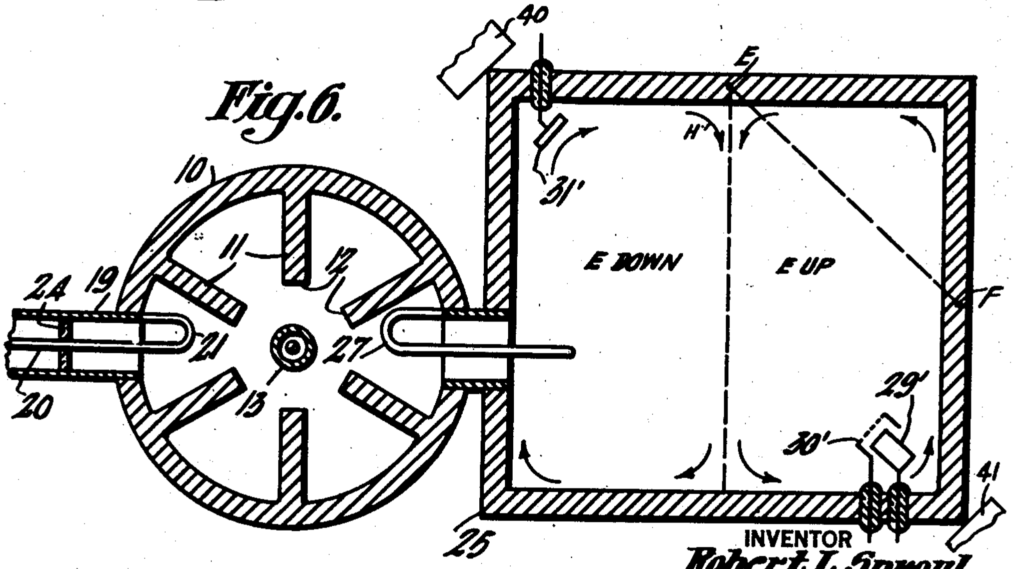
Figure 9:
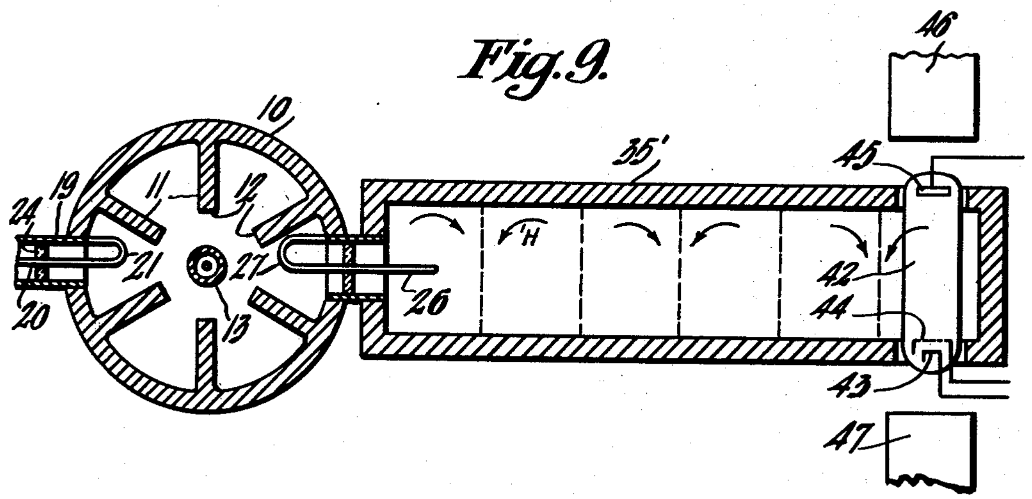
Figure 10:
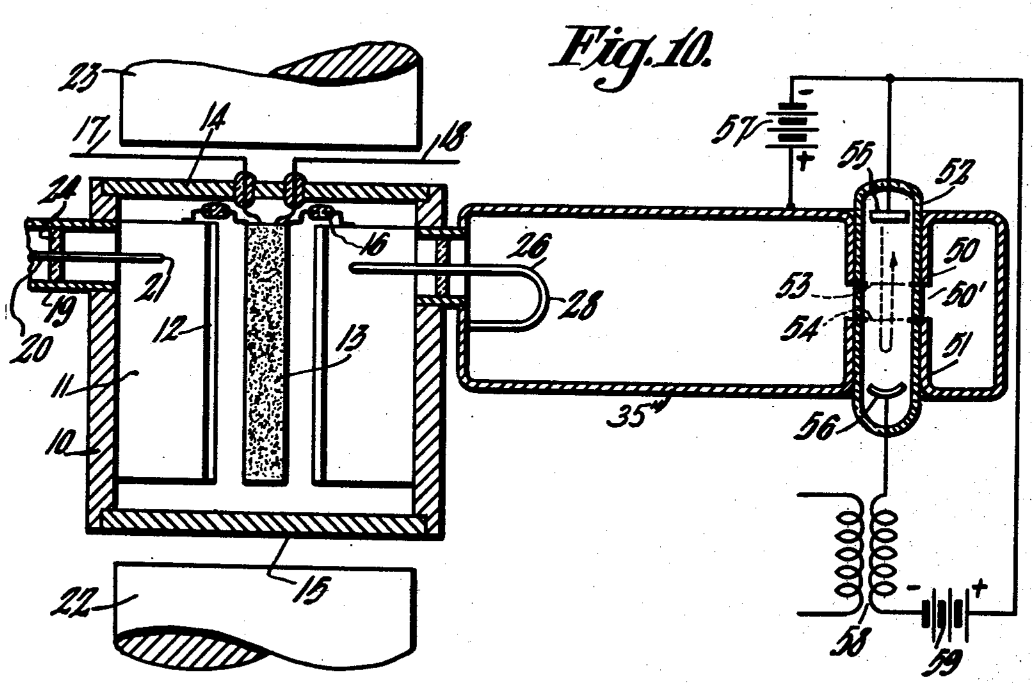

The novel features which I believe to be characteristic of my invention are set forth with particularity in the appended claims, but the invention itself will best be understood by reference to the following description taken in connection with the accompanying drawing in which Figures 1 and 2 are graphs illustrating principles of operation involved in frequency modulating systems of the kind under consideration, Figure 3 is a transverse section taken along the line 3—3 of Figure 4 and showing an oscillator coupled to a frequency modulating device made according to my invention, Figure 4 is a longitudinal section taken along the line 4—4 of Figure 3, Figure 5 is a transverse section of the device shown in Figures 3 and 4 but operating in a different mode, Figure 6 shows a modification of the system shown in Figure 3, Figure 7 is a longitudinal section of a modification of the system shown in Figure 3, and Figure 8 is a longitudinal section of the device shown in Figure 7 but operating in a different mode, and Figures 9 and 10 are longitudinal sections of a still further modification of Figures 7 and 8.

The graph in Figure 1 illustrates the frequency relationship of an oscillator and the coupled circuit where the oscillator is coupled to a circuit having a "reactance tube," for example, in the form of a diode. This is for conditions of constant Q and for a constant coupling coefficient $k^2$.

If the resonant frequency $f_c$ of the coupled circuit is electronically varied by an amount $\delta_1$ when the circuit is mechanically tuned to the value $f_{c1}$, the change $\Delta_1$ in oscillator frequency is produced. However, at a different resonant frequency of the coupled circuit, for example $f_{c2}$ as shown on the graph, changing the resonant frequency by mechanical tuning, so that the same change in frequency $\delta_2$ is equal to the previous change in frequency $\delta_1$ of the coupled circuit, produces a different change $\Delta_2$ in the oscillator frequency. This means that a drift in frequency, due to either temperature changes, the load or other changes of the magnetron frequency $f_o$ or of the coupled circuit frequency $f_{c1}$, will make a large difference in the amount of change in the frequency $f$ of the oscillations corresponding to a fixed change $\delta$ in $f_c$ of the coupled circuit.

Also, even over the range $\delta_1$, the slope $df/df_c$. or the ratio of the change in the frequency of the oscillator to the change in the frequency of the coupled circuit, is not constant and as a result a non-linear modulation characteristic ensues. Moreover, in order to make the slope $df/df_c$ appreciable $f_{c1}$ must be chosen near the resonant frequency $f_o$ of the oscillator. This entails high currents and fields in the coupled circuit with the disadvantages pointed out above.

A frequency modulating system made according to my invention, however, eliminates the above disadvantages and has other desirable features. According to my invention a coupled circuit having two closely spaced resonant frequencies $f_{c1}$ and $f_{c2}$ is employed. The "reactance tube" or other method of varying the frequency of the coupled circuit is so arranged as to vary both the resonant frequencies of the coupled circuit in the same direction and by approximately the same amount. A theory explaining my invention is set forth below.

If the mean or resultant circuit frequency $f_c$ is equal to $$\frac{f_{c1}+f_{c2}}{2}$$

and also if 2A is equal to $|f_{c2}-f_{c1}|$ then the oscillator frequency $f$ will behave as graphically illustrated in Figure 2 with maximum excursions of the frequency of the oscillator from $f_o$, its resonant frequency, occurring in the regions $f_c=f_o-A$ and $f_c=f_o+A$. Assuming that the reactance element changes both $f_{c1}$ and $f_{c2}$ by the same amount and in the same direction, controlling the reactance of said element may be regarded simply as a change in the resultant frequency $f_c$ of the coupled circuit. Thus, in Figure 2 if the unmodulated mean frequency $f_c$ of the coupled circuit is chosen equivalent to the resonant frequency $f_o$ of the oscillator and the mean frequency of the coupled circuit $f_c$ is changed by the amount $\delta$, the frequency relationships will be those shown in Figure 2. Either the value of $f_c$ or the value $f_o$ can drift a considerable extent without changing the "slope of the modulation characteristic" appreciably. For example, the value of $f_c$ can vary between $f_o+A$ and $f_o-A$ without changing the sign of $d\Delta/d\delta$, and if A is not too large relative to the resonant frequency $f_o$, the "region R" can be made relatively straight. This has the additional advantage of producing more nearly linear control of $f$, the oscillator frequency, by controlling $f_c$. If the Q's of the two resonances are equal and the circuits are similar, it can be shown mathematically that strong non-linearity in the region near $f_c=f_o$ is prevented.

The absolute magnitude of the power dissipated in the circuits, on the other hand, is a minimum with $f_c=f_o$. Thus the region used, that is the region near $f_c=f_o$, corresponds to the minimum power absorption and also the minimum change in power as $f_c$ is changed, that is minimum amplitude modulation as the frequency is modulated. Since the currents and fields in the coupled circuit are relatively small near $f_c=f_o$, see Figure 2, the method of varying the resonant frequency of the coupled circuit as described in the Smith application Serial No. 563,732 above referred to may be applied most advantageously.

Below is described how the oscillator which may be in the form of a cavity type magnetron may be coupled to a modulating resonant circuit, in one example a cavity resonator modulated by an electron beam, the coupled circuit utilizing a two-resonant frequency characteristic, the electron beam changing both resonant frequencies by approximately the same amount.

The double resonance circuit can be obtained in several ways. At low frequencies and medium high frequencies, ordinary coils and condensers could compose a circuit with two resonant frequencies. The reactance element could be introduced in a branch of the circuit, such that in general the impedance function $$Z=j\omega B\frac{(\omega^2-\omega_1^2)(\omega^2-\omega_3^2)\ \ldots}{\omega^2(\omega^2-\omega_2^2)\ \ldots}$$

where B is a constant, and $\omega$, $\omega_1$, $\omega_2$ and $\omega_3$ are the various resonant $\omega$'s of the various brackets of the circuit and where $\omega$, the oscillating angular frequency, $=2\pi f$. Both $\omega_1$ and $\omega_3$ (or $\omega_2$ and $\omega_4$) were varied by the same amount. This can be done in a number of ways, the best way depending on the reactance element and the method of coupling the generator.

The present invention, however, is primarily concerned with very high frequencies and circuits particularly suitable for high frequencies and in which a cavity resonator or resonant transmission line can be used.

Referring to Figures 3, 4 and 5, there is shown one example of my invention employing a cavity type magnetron as the oscillator coupled to a circuit for providing a frequency modulating system. The magnetron comprises the envelope 10 provided with a plurality of radially extending slat-like elements 11, the inner ends 12 of which form the anode elements. The envelope wall and the surfaces of the slat-like elements comprise cavity resonators coupled between adjacent anode elements 12. The inner ends of the slats or anode elements 12 define a space in which is positioned the indirectly heated cathode 13. The envelope may be closed by plate-like members 14 and 15 hermetically sealed to the envelope 10. The cathode 13 may be insulatingly supported by the wire and glass bead construction 16 from the slat-like elements. The heater wires 17 and 18, one of which may be connected to the cathode, are insulatingly sealed through the cover member 14. The output may be taken by means of a coupling loop 21 terminating in a coaxial line comprising outer conductor 19 and inner conductor 20, a hermetic and insulating seal 24 providing a vacuum-tight seal. The magnetic field may be provided by means of a magnet having poles 22 and 23.

According to my invention, the coupled circuit in the present instance is a nearly square cavity resonator 25 capable of operating in two modes. Extending through the cavity is an electron beam device comprising a cathode 29 and a control electrode 30 for providing a modulated beam of electrons directed to a collector 31.

Obviously the oscillator need not be a magnetron employing cavity resonators. The oscillator resonator could be driven by any means and frequency modulated by a second resonator operating in two modes coupled to this oscillator resonator.

Figures 3 and 5 illustrate the two modes in which the resonator 25 is excited by the magnetron which builds up and maintains the radio frequency fields in the cavity resonator. Because of its slight dissymmetry the resonator may be separately excited in either of the two modes as illustrated, which modes are closely spaced with respect to their resonant frequency, the first frequency $f_{c1}$ being excited in the mode illustrated in Figure 3, and the second frequency $f_{c2}$ as in Fig. 5. The difference between the two resonant frequencies can be adjusted by changing the ratio of dimension AB to dimension BC. The amount of difference depends upon the amount of dissymmetry from a regular form. Although a rectangle is shown a cylinder or drum-shaped member which is slightly elliptical could also be utilized for the coupled circuit. Because of this dissymmetry it is possible to excite more than one mode at the same time. When the resonator is coupled to an oscillator of resonant frequency $f_0$ different from the resonator mode frequencies $f_{c1}$ and $f_{c2}$, each of these resonant frequencies tends to "pull" the generated frequency $f$ of the oscillator toward a value intermediate that mode frequency and $f_0$. If $f_0$ is equal to the mean or average $f_c$ of the two mode frequencies, the "pulling" forces of the two mode frequencies are balanced, so that although the resonator oscillates in both of its modes, the entire system oscillates at the same frequency, $f=f_0=f_c$. Now, if $f_c$ is varied, by varying the resonant frequencies $f_{c1}$ and $f_{c2}$ in the same direction, the generated frequency $f$ will vary, as shown in Fig. 2.

The frequency varying element is positioned so that it is similarly coupled to both modes. In the example shown the resonant frequencies of both modes are equally changed by the amount of current inserted at the positions shown, off-center with respect to the axis of the resonator but equally coupled to both modes. In the example shown, I provide an electron discharge device comprising an evacuated envelope 30′ having at one end cathode 29 and control grid 30 and at the other end collector 31. In this arrangement the reactive current is parallel to the electric field and transverse to the magnetic field. Mathematically it can be shown that the shift in frequency will be $$\Delta f = I.P.\frac{\iiint_v J.Edv}{4\pi\epsilon_0 \iiint_v E.E^*dV}$$

for a current of density J over a volume $v$ in a cavity of volume V, where E is equal to the electric field in volts per meter and $\epsilon_0$ is equal to $8.85\times10^{-12}$ farads per meter. I. P.=imaginary part; $f$ means frequency, $E^*$ is the complex conjugate of E. By locating the reactive current at the point shown and where E has approximately the same relative amplitude with respect to the maximum at the center of each cell of the cavity as defined by the magnetic lines of force; $\Delta f$, that is the change in frequency, can be made approximately the same for the two modes. The coupling to the cavity is also arranged so that equal coupling of the magnetron to each of the two modes is obtained. This is secured by locating the coupling loop 26 so that it links equal magnetic flux in the two modes.

In Figure 6 I show a modification of the arrangement shown in Figures 3 and 4. In this arrangement the electron beam is directed diagonally across the resonator so that it couples to both cells of the cavity. It will be obvious in the arrangement shown that both modes are coupled in a like manner. Since the average electric field and space variation of the field is similar in the two modes, the resonant frequencies of the two modes identified as 2, 1, 0 and 1, 2, 0 will each be changed by the same amount when the current from the cathode 29′ is varied by the grid 30′ and collected by collector 31′. In this arrangement, however, I also employ means for providing a magnetic field parallel to the electron beam, these means including the pole pieces 40 and 41. The arrangement then varies the resonant frequency of each mode in accordance with the principles set forth in the Smith application Serial No. 563,732 above referred to. While the beam is shown directed diagonally across the resonator from one corner to the other the same effect can be obtained by directing the beam across the point EF where the beam would also couple both modes to the same extent, it being understood that only one mode is shown.

A modification of the arrangement shown in Figures 3 and 4 is shown in Figures 7 and 8. Here a long cavity or transmission line is shown. The two resonant mode frequencies which may be separately excited are spaced closely together and are obtained by having a large number of nodes in the same orientation. The resonant frequency $f_1$ of Figure 8 corresponds to 7, 1, 0 mode and $f_2$ in Figure 7 corresponds to 6, 1, 0 mode. In this last arrangement the beam may be slightly off center to the same extent with respect to each mode.

In Figure 9 I show the principle of the Smith application Serial No. 563,732 employed in the forms of resonators shown in Figures 7 and 8. In this case the beam of electrons, however, is directed transversely of the electric field and parallel to the magnetic field. I employ an electron discharge device extending into resonator 35′ and having an envelope 42, cathode 43, control electrode 44 and collector electrode 45. The electromagnets 46 and 47 provide a magnetic field parallel to the beam which is directed transversely of the resonator 35.

In Figure 10 I show a reactance tube in the form of a velocity modulated tube employing the now well known reflex action brought about by reflecting the electron stream back through the resonator. In this arrangement resonator 35′′ is provided with re-entrant portions 50 and 51 extending from opposite faces of the resonator and provided with a gap 50′. The electron discharge device having evacuated envelope 52 and containing at one end cathode 55 and at the other end cathode 56 is provided intermediate its ends with a pair of transverse grids 53 and 54 electrically connected to the inner ends of the re-entrant portions 50 and 51, thereby forming a continuation of the resonator walls. The reflex action of the tubes of this type is now well known. The electrons in crossing the gap the first time are velocity modulated and become bunched to form groups, which are reflected back through the grids to give up energy to the resonator. The reflector 56 is maintained at a negative potential by means of the voltage source 59 and the resonator at a high positive potential, for example, in the neighborhood of 500 volts, by means of the voltage source 57. Modulating voltages may be applied to the reflector 56 by means of transformer 58. The operation, however, is like that of the apparatus shown in Figures 7 and 8. In this last case the resonant mode frequencies vary in accordance with the applied modulating signal.

While I have indicated the preferred embodiments of my invention of which I am now aware and have also indicated only one specific application for which my invention may be employed, it will be apparent that my invention is by no means limited to the exact forms illustrated or the use indicated, but that many variations may be made in the particular structure used and the purpose for which it is employed without departing from the scope of my invention as set forth in the appended claims.

What I claim as new is:

1. A frequency modulating system including an oscillator and a means for frequency modulating said oscillator, said means including a circuit coupled to said oscillator, said circuit including a cavity resonator having structural dissymmetry whereby said resonator may be excited simultaneously in two different modes having closely spaced resonant frequencies, means for simultaneously varying the resonant frequencies of both of said modes to vary the resultant frequency of the resonator, and means for controlling said last means to frequency modulate said oscillator.

2. A frequency modulating system including a magnetron having a plurality of cavity resonators and a frequency modulating means coupled to one of said cavity resonators and including a second cavity resonator having structural dissymmetry whereby said second resonator may be excited simultaneously in two different modes having two different closely spaced resonant frequencies, means for directing an electron beam through said second resonator, said beam being coupled to both modes to the same extent, and means for controlling said beam for varying said frequencies in the same direction to the same extent for varying the resultant frequency of oscillation of said second resonator and frequency modulating said magnetron.

3. A frequency modulating system including a magnetron having a plurality of anode elements defining a central chamber, a cathode for supplying electrons within said chamber, said magnetron having cavity resonators coupled between adjacent anode elements, another cavity resonator coupled to one of said magnetron resonators for frequency modulating said magnetron, said other cavity resonator having structural dissymmetry whereby said other cavity resonator may be excited simultaneously in two modes having closely spaced resonant frequencies, a cathode means for supplying a stream of electrons within said other resonator asymmetrically with respect to an axis of said resonator to vary the frequency of said resonator, means for controlling the electron stream from said cathode, and means for receiving said electrons, a coupling means extending between said one resonator of said magnetron and said other cavity resonator and including a coupling loop positioned to be coupled to both modes of excitation of said other resonator, said coupling loop being positioned eccentrically with respect to an axis of said other cavity resonator.

4. A frequency modulating system including an oscillator having a first resonator and means for frequency modulating said oscillator, said means including a second resonator coupled to said first resonator, said second resonator having structural dissymmetry whereby said resonator may be excited simultaneously in two different modes having closely spaced resonant frequencies, means for simultaneously varying the resonant frequency of both modes for varying the resultant frequency of said second resonator and including an electron discharge device positioned asymmetrically with respect to said resonator and having a cathode for directing a reactive electron beam current through said resonator during operation of said system for coupling said beam to both of said modes, and means within said electron discharge device for controlling the reactive current for varying the resonant frequencies of said modes simultaneously to frequency modulate said oscillator.

5. A frequency modulating system including an oscillator having a first resonator and means for frequency modulating said oscillator, said means including a second resonator coupled to said first resonator, said second resonator having structural dissymmetry whereby said second resonator may be excited simultaneously in two different modes having closely spaced resonant frequencies, means for simultaneously varying the resonant frequency of both modes for varying the resultant frequency of said second resonator and including a cathode for directing an electron beam through said resonator asymmetrically with respect to said resonator during operation of said system for coupling said beam to both of said modes and means associated with said cathode for varying the intensity of said beam for varying the resonant frequencies of said modes simultaneously to frequency modulate said oscillator, said electron beam being directed transversely of the electric field and parallel to the magnetic field within said second resonator during operation of said oscillator and means associated with said second resonator for providing a magnetic field parallel to the path of the electron beam.

6. A frequency modulating system including an oscillator having a resonator and means for frequency modulating said oscillator, said means including a second resonator coupled to said first resonator, said second resonator having structural dissymmetry whereby said second resonator may be excited simultaneously having two different modes of closely spaced resonant frequencies, means for simultaneously varying the resonant frequency of both modes for varying the resultant frequency of said second resonator and including an electron discharge device positioned asymmetrically with respect to said resonator and having a cathode for directing an electron beam current through said resonator during operation of said system for coupling said beam current to both of said modes and means for varying the current for varying the resonant frequencies of said modes simultaneously to frequency modulate said oscillator, said electron discharge device including an envelope having a cathode at one end of said device and another electrode at the other end of said device, and positioned to extend within said second resonator, said second resonator having a pair of registering re-entrant tubular portions separated by a gap providing a passageway through said resonator for receiving said electron discharge device, said electron discharge device being provided with a pair of transverse apertured electrodes registering with said gap and connected to the inner ends of the re-entrant portions of said resonator.

7. A frequency modulating system including an oscillator having a resonator and means for frequency modulating said oscillator, said means including a second resonator coupled to said first resonator, varying electric and magnetic fields being initiated within said second resonator during operation of said oscillator, said second resonator having structural dissymmetry whereby said second resonator may be excited simultaneously in two different modes having closely spaced resonant frequencies, means for simultaneously varying the resonant frequency of both modes for varying the resultant frequency of said second resonator and including means for directing an electron beam diagonally across a transverse axis of said second resonator and transversely of the electric field within said second resonator, and means associated with said second resonator providing a magnetic field parallel to said electron beam.

8. A frequency modulating system including an oscillator having a first resonator and means for frequency modulating said oscillator, said means including a second resonator coupled to said first resonator, said second resonator being elongated whereby it is capable of being excited simultaneously in two different modes having closely spaced resonant frequencies, means for simultaneously varying the resonant frequency of both modes for varying the resultant frequency of said second resonator, and including a cathode at the end remote from the coupled end for directing an electron beam current through said second resonator during operation of said system and coupling said beam current to both of said modes and means associated with said cathode for varying the beam current for varying the resonant frequencies of said modes simultaneously to frequency modulate said oscillator.

9. A frequency modulating system including an oscillator having a first resonator and means for frequency modulating said oscillator, said means including a second resonator coupled to said first resonator, said second resonator being substantially rectangularly shaped whereby said second resonator may be excited simultaneously in two different modes having closely spaced resonant frequencies, means for simultaneously varying the resonant frequency of both modes for varying the resultant frequency of said second resonator, and including an electron source positioned asymmetrically with respect to said resonator for directing an electron beam through said resonator during operation of said oscillator for coupling said beam to both of said modes and means associated with said cathode for varying the electron beam for varying the resonant frequencies of said modes simultaneously to frequency modulate said oscillator.

10. A frequency modulating system including an oscillator having a first resonator and means for modulating said oscillator, said means including a second resonator coupled at one end to said first resonator to be excited by said oscillator, said second resonator being elongated whereby it is capable of being excited simultaneously in two different modes having closely spaced resonant frequencies, means for simultaneously varying the resonant frequency of both modes for varying the resultant frequency of said second resonator and including a cathode associated with said second resonator for directing an electron beam current through said second resonator at the end remote from the coupled end during operation of said system, and coupling said beam current with both of said modes, and means associated with said cathode for varying the beam current to vary the resonant frequency of said modes simultaneously to frequency modulate said oscillator, and means for providing a magnetic field parallel to the path of said beam current, said beam current being directed transversely of the electric field generated within said second resonator and parallel to the magnetic field of said second resonator during operation of said system.

11. A frequency modulating system including an oscillator having a first resonator and means for frequency modulating said oscillator, said means including a second resonator coupled to said first resonator to be excited by said oscillator, said second resonator being substantially rectangularly shaped whereby said second resonator may be excited simultaneously in two different modes having closely spaced resonant frequencies, means for simultaneously varying the resonant frequency of both modes for varying the resultant frequency of said second resonator and including an electron source associated with said second resonator for directing an electron beam diagonally across said second resonator and transversely of the electric field and parallel to the magnetic field within said second resonator during operation of said system, and means associated with said second resonator for providing a magnetic field parallel to the path of the electron beam.

12. An electrical system including an oscillator and means for frequency modulating said oscillator, said means including a resonant circuit normally resonant in two different modes having closely-spaced resonant frequencies, said circuit being coupled to said oscillator and excited thereby in both of said modes at a resultant frequency intermediate said two resonant frequencies, and means for simultaneously varying both of said resonant frequencies to vary said resultant frequency.

13. An electrical system according to claim 12, wherein said oscillator has a normal resonant frequency intermediate said two resonant frequencies of said circuit.

14. An electrical system according to claim 13, wherein said oscillator is a cavity resonator magnetron.

ROBERT L. SPROULL.

REFERENCES CITED

The following references are of record in the file of this patent:

UNITED STATES PATENTS

| Number | Name | Date |
|---|---|---|
| 2,027,975 | Hansell | Jan. 14, 1936 |
| 2,030,125 | Usselman | Feb. 11, 1936 |
| 2,241,976 | Blewett et al. | May 13, 1941 |
| 2,259,690 | Hansen et al. | Oct. 21, 1941 |
| 2,281,935 | Hansel et al. | May 5, 1942 |
| 2,337,214 | Tunick | Dec. 21, 1943 |
| 2,421,725 | Stewart | June 3, 1947 |